Patented Sept. 22, 1931

1,823,946

UNITED STATES PATENT OFFICE

GEORG KRÄNZLEIN AND HEINRICH VOLLMANN, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF DYEING AND PRINTING VEGETABLE FIBERS

No Drawing.    Application filed August 2, 1928. Serial No. 297,105.

Our present invention relates to a new process of dyeing and printing vegetable fibers.

It has already been known for some time that 3.4.8.9-dibenzpyrenquinone-5.10 and derivatives thereof are capable of dyeing vegetable fibers from the vat intense tints (cf. U. S. patent specifications No. 1,564,584 dated December 8, 1925, and No. 1,582,475 dated April 27, 1926, and U. S. patent application Ser. No. 70,986 filed November 23, 1925). According to a publication of R. Scholl in "Berichte der deutschen chemischen Gesellschaft", volume 55, page 123, however, the isomeric 4.5.8.9-dibenzpyrenquinone-3.10 has been stated to have no affinity to the vegetable fiber.

In contradiction to this statement we have made the observation that both the unsubstituted 4.5.8.9-dibenzpyrenquinone-3.10 and its derivatives, so far as they have hitherto been known, show an excellent affinity to the vegetable fiber and are, therefore, capable of dyeing cotton intense shades from the cold or warm vat. The dyestuffs of the 4.5.8.9-dibenzpyrenquinone-3.10 class are also eminently suitable for calico printing. For this purpose, most dyestuffs of this class can be utilized in an unreduced state as well as in a previously reduced state. The dyestuffs yield in almost all cases brilliant tints varying from orange to violet of good to very good fastness properties. Since clear red vat dyestuffs fast to washing and to light are still scarce, it is a considerable advantage of the above-mentioned class of dyestuffs that it contains a particularly large number of red dyestuffs yielding dyeings from yellowish scarlet to bluish-red.

The following examples illustrate our invention, but they are not intended to limit it thereto; the parts are by weight:

1. A vat is prepared from 2 parts of 4.5.8.9-dibenzpyrenquinone-3.10 in the form of a 10 per cent paste, 1 part of caustic soda solution of 40° Bé., 0.8 part of hydrosulfite concentrated powder, 10 parts of calcined sodium sulfate and 200 parts of distilled water.

When after ¼ hour the vat has formed, there are introduced into it 10 parts of cotton yarn which are dyed at 20° C. to 30° C. for ½ hour. The material is then rinsed, soaped at boiling temperature and rinsed again. Thus an intense clear scarlet dyeing is obtained of good fastness properties.

In the same manner the material may be dyed with one of the following substituted 4.5.8.9 - dibenzpyren - 3.10 - quinones. The shades of dyeings obtainable therewith are indicated in the following table:

| Constitution | Dyeing |
|---|---|
|  | Clear orange red |
|  | Clear reddish-orange |
|  | Clear scarlet (or isomeric bodies) |
|  | Clear bluish-red |

2. A vat is prepared from 2 parts of dibromo-4.5.8.9-dibenzpyrenquinone-3.10 (obtainable by brominating 4.5.8.9-dibenzpyrenquinone), 1.4 parts of caustic soda solution of 40° Bé., 0.8 parts of hydrosulfite concentrated powder, 5 parts of calcined sodium sulfate and 200 parts of distilled water.

The preparation is allowed to stand at 50° C. for ¼ hour and the material is then dyed in the vat thus obtained at the same temperature for ½ hour. The material is soaped and rinsed, whereupon a dyeing is obtained of an intense bluish-red tint.

We claim:

1. The process which consists in dyeing vegetable fiber with a dyestuff of the following formula:

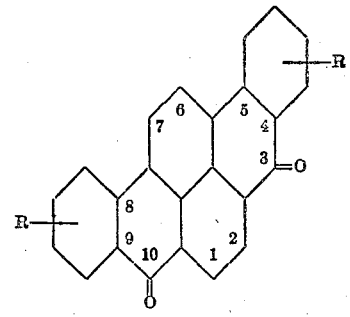

wherein R stands for hydrogen, halogen or alkyl.

2. The process which consists in dyeing vegetable fiber with the dyestuff of the following formula:

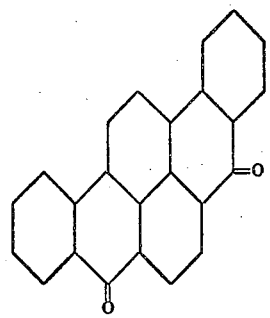

3. Material prepared from vegetable fibers dyed with a dyestuff of the 4.5.8.9-dibenzpyren-3.10-quinone series, the brilliant shades thus produced on the material varying from orange to violet and possessing good fastness properties.

4. Material prepared from vegetable fibers dyed with a dyestuff of the following formula:

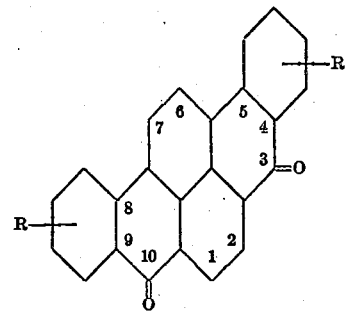

wherein R stands for hydrogen or halogen, the shades thus produced on the material varying from orange to scarlet and possessing good fastness properties.

5. Material prepared from vegetable fibers dyed with the dyestuff of the following formula:

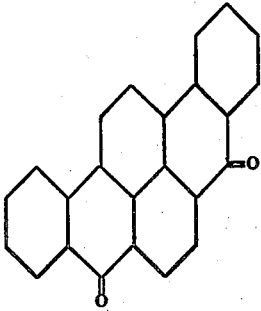

the shade thus produced on the material being an intense clear scarlet of good fastness properties.

6. The process which consists in dyeing vegetable fiber with a dyestuff of the 4.5.8.9-dibenzpyrene-3.10-quinone series by one of the usual methods used for dyeing with vat-dyestuffs.

In testimony whereof, we affix our signatures.

GEORG KRÄNZLEIN.
HEINRICH VOLLMANN.